United States Patent [19]
Doucet et al.

[11] 4,345,329
[45] Aug. 17, 1982

[54] FREE-ELECTRON LASER PROVIDED WITH A DEVICE FOR PRODUCING A PULSED MAGNETIC FIELD WITH PERIODIC SPATIAL VARIATIONS

[75] Inventors: Henri Doucet, Les Molieres; Christian Tournes, Mareil Marly, both of France

[73] Assignee: Agence Nationale de Valorisation de la Recherche (ANVAR), Neuilly sur Seine, France

[21] Appl. No.: 105,784

[22] Filed: Dec. 20, 1979

[30] Foreign Application Priority Data

Dec. 22, 1978 [FR] France ................................ 78 36123

[51] Int. Cl.³ .............................................. H01S 3/09
[52] U.S. Cl. .......................................................... 372/2
[58] Field of Search ................... 331/94.5 PE, 94.5 P, 331/94.5 M, 94.5 D, 94.5 C; 315/3.5

[56] References Cited

PUBLICATIONS

"Stimulated Emission From Relativistic Electrons Passing Through A Spatially Periodic Transverse Magnetic Field", *Phys. Rev. A*, Kroll et al., vol. 17, No. 1, Jan. 1978.

"Amplification on a Relativistic Electron Beam in a Spatially Periodic Transverse Magnetic Field", by Bernstein et al., *Phys. Rev. A*, vol. 20, No. 4, Oct. 1979.

*Primary Examiner*—William L. Sikes
*Assistant Examiner*—Léon Scott, Jr.

[57] ABSTRACT

A magnetic field having an alternate component in a predetermined direction is produced in a zone and electrons are injected into this zone perpendicularly to said direction. To this end a winding is connected to a source for supplying current pulses having a predetermined duration. A split tube is placed coaxially within the winding and has an inner wall which provides periodic or nearly periodic variations. The split tube is formed of material having good electrical conductivity and has a skin thickness which is considerably smaller than the tube thickness at the frequency corresponding to the reciprocal of the time-duration of the current pulses.

5 Claims, 2 Drawing Figures

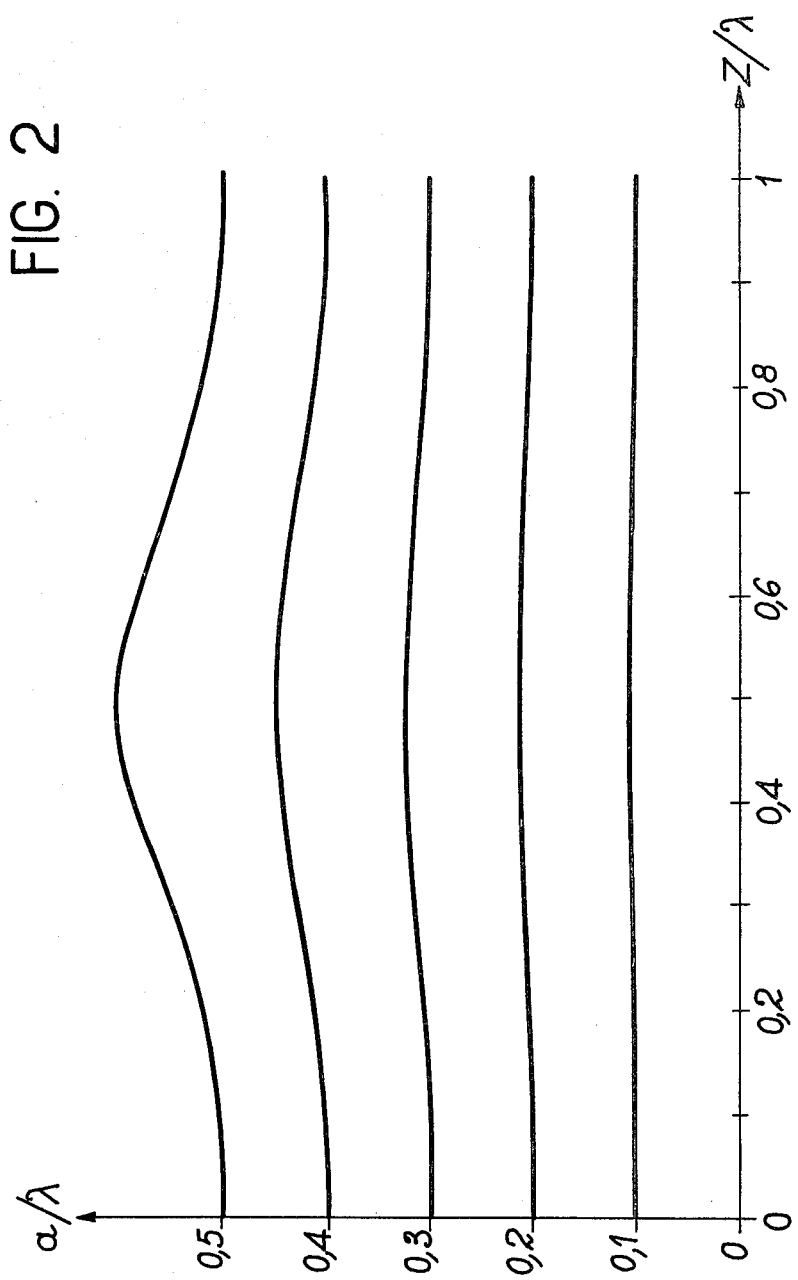

FREE-ELECTRON LASER PROVIDED WITH A DEVICE FOR PRODUCING A PULSED MAGNETIC FIELD WITH PERIODIC SPATIAL VARIATIONS

This invention relates to a free-electron laser provided with a device for producing a pulsed magnetic field with periodic spatial variations.

When an electron beam is injected into a magnetic field with a perpendicular energy (that is, an energy corresponding to a transverse velocity), the electrons acquire cyclotron motion which gives rise to so-called cyclotron radiation. Relativistic effects modify this radiation and convert it to synchrotron radiation, the frequency of which is the same as the synchrotron frequency of the electrons.

If certain conditions are satisfied, this radiation can be amplified by extracting energy from the electrons in a manner which bears some resemblance to the amplification mechanism in an optical laser. These devices are consequently designated as "free-electron lasers" or alternatively as "synchrotron masers". Since amplification of radiation is made possible by means of a magnetic field, it has been said that this process consists of "magnetic pumping" by analogy with the "optical pumping" technique which is a basic principle of optical lasers. Hence the expression "magnetic pump wave" which has come into use in this connection.

In the following description, a "free-electron laser" is therefore understood to mean a generator in which an electromagnetic wave interacts with an amplifying medium constituted by unbound electrons, the energy states of which are determined in particular by a magnetic field.

The mechanism of interaction between an electromagnetic wave and electrons which constitute an amplifying medium can be of different types. For example, it can involve the phenomenon known as magnetic "bremstrahlung" (which results from a Compton effect associated with a Doppler effect) or collective phenomena (such as the stimulated Raman effect) or alternatively the Cerenkov effect and so forth.

The efficiency of a free-electron laser is essentially related to the conversion of the longitudinal energy of the electron beam (which is the energy corresponding to the axial component of the electron velocity and also known as "parallel energy") to transverse energy (namely the energy corresponding to the velocity component located in the plane perpendicular to the mean axis of the beam, also known as "perpendicular energy").

This conversion of parallel energy to perpendicular energy can be obtained in several ways. One of the methods employed consists in producing a periodic static magnetic field by means of an alternate series of different magnetic cores placed in a uniform magnetic field. This field can be produced by a winding which is suitably supplied with current and can also be superconducting. This method is described for example in U.S. Pat. No. 3,789,257 filed on Jan. 29, 1974 and entitled "Coherent Microwave Generators".

In one type of electron generator which has also been constructed in the past, provision was made for an alternate series of magnets which produce a magnetic field having a periodically varying transverse component. Relevant information on this subject can be obtained from the article by H. Motz published in the "Journal of Applied Physics", Vol. 22, No. 5, May 1951, pages 527–535 and from the article by H. Motz et al. published in the same review, Vol. 24, No. 7, July 1953, pages 826 to 833.

Finally, in generators of this type, there have been employed "helical magnets" constituted by two superconducting helical coils wound in opposite directions. A generator of this type is described in the article by L. R. Elias et al., published in "Physical Review Letters" Vol. 36, No. 13, Mar. 29, 1976, pages 717–720.

The two last-mentioned structures result in the formation of an alternate transverse field without a longitudinal magnetic field.

Reference can also be made on this subject to the article by V. L. Granatstein et al. entitled "An electron synchrotron maser based on an intense relativistic electron beam" published in "Journal of Applied Physics", Vol. 46, No. 5, May 1975, pages 2021 to 2028.

A magnetic field having periodic spatial variation can be characterized by its modulation ratio or in other words by the ratio $B_1/B_0$ of the amplitude $B_1$ of the variations in the magnetic field to the mean field $B_0$. In the devices of the prior art which have just been mentioned, this modulation ratio is of low value and typically of the order of a few units percent. In point of fact, in a free-electron laser, the power of the pump wave is proportional to the square of the amplitude $B_1$. The devices which have just been referred-to are ill-suited to the construction of high-power lasers.

The precise aim of the invention is to provide an electron laser having a structure which makes it possible to increase the modulation ratio $B_1/B_0$ to a considerable extent and correlatively to increase the power of the pump wave. Furthermore, this structure makes it possible to reduce the harmonic ratio of the magnetic field within the interaction space, thus improving the efficiency of the latter.

The device according to the invention makes use of a technique which is known per se, namely the technique of magnetic flux concentrators. In very general terms, a flux concentrator comprises a coil supplied with current by pulses having a time-duration T which depends on the electrical characteristics of the circuit. This coil produces a pulsed magnetic flux. The concentrator proper consists of a split tube having good electrical conductivity and placed within the coil, the inner wall of said tube being provided with a narrowed portion which reduces the wall surface area from a value S to a smaller value s.

If the skin thickness of the material constituting the tube is much smaller than the tube thickness at the angular frequency $2\pi/T$, the magnetic field must conform to the shape of the inner wall of the tube. The magnetic flux is therefore guided by said wall and caused to pass through the narrowed portion. The magnetic induction is therefore increased in the ratio S/s in said narrowed portion since the flux is conservative.

In order to obtain a magnetic field having periodic spatial variation in an electron laser, the invention proposes to employ a flux concentrator of this type in which the inner wall has a suitable periodicity. There is accordingly obtained a field having a modulation ratio which is much higher than devices of the prior art which exhibit local perturbations since the amplitude $B_1$ of the field variations can be of the order of 10 Teslas. The equivalent pump power then attains $10^{16} W/m^2$, namely 1 terawatt per $cm^2$, which is considerable and leads to very high power lasers.

The use of a flux concentrator of this type secures a further advantage. Since the magnetic field distribution within the metallic tube is solely dependent on the shape of the inner wall of said tube, a particular distribution can readily be obtained within this zone by suitable machining of said inner wall. It is possible in particular to obtain a sinusoidal variation of the field along an axis or over a surface with a very low harmonic ratio. This was not the case in devices of the prior art in which the use of alternate magnets or helical lines resulted in a field which was in fact periodic but which was far from being purely sinusoidal.

Furthermore, in order to increase the efficiency of the laser, it may be found necessary first of all to produce a suitable modulation of the electron beam, then to modify the spatial periodicity to a slight extent in order to maintain optimum conditions of emission progressively as the electrons lose energy by radiation. These conditions can readily be solved by means of a flux concentrator, solely by modifying the shape of the inner walls of the concentrator tube.

In more precise terms, the invention is directed to a free-electron laser comprising means for producing within a zone a magnetic field having an alternate component in a predetermined direction, and means for injecting electrons into said zone perpendicularly to said direction; the laser according to the invention is distinguished by the fact that said means comprise a winding connected to a source for supplying current pulses having a predetermined duration, a split tube placed within said winding in coaxial relation thereto and having an internal wall providing periodic or nearly periodic variations. Said split tube is formed of material having good electrical conductivity and has a skin thickness which is considerably smaller than the tube thickness at the frequency corresponding to the reciprocal of the time-duration of the current pulses.

The laser according to the invention necessarily operates on the pulse principle since the flux concentrator operates only under pulsating conditions. This operating characteristic is employed to advantage in a particular embodiment which will now be explained. The laser comprises a second metallic tube which is placed inside the first and delimits the wave-electron interaction space. Said second tube is of sufficiently small thickness to ensure that the pulsed magnetic field can pass through the tube and penetrate into the interaction zone. In other words, the thickness of said second tube is very much smaller than the skin thickness of the constituent tube material at the frequency $2\pi/T$ corresponding to the reciprocal of the time-duration T of the current pulses which produce the pulsed magnetic field. On the other hand, the thickness of said second tube is preferably very much greater than the skin thickness of the tube material at the frequency corresponding to the electromagnetic wave emitted by the laser. By virtue of this second condition, the second tube is permitted to perform the function of waveguide for the amplified radiation.

It is readily apparent that said second metallic tube is not indispensable. Thus an insulating tube could be employed in order to delimit the interaction space. It would even be possible to dispense with the second tube altogether, in which case the first tube having an undulated inner wave can also serve as a waveguide. The advantage of the alternative embodiment just mentioned is to impose on the electromagnetic wave a conductive boundary surface which is periodic so that the phase velocity of said wave consequently falls to a value which can be considerably lower than the velocity of propagation in free space, which accordingly facilitates matching between the electron velocity and the wave velocity. The interaction can then take place on this low-velocity wave.

The distinctive features and advantages of the invention will in any case become more readily apparent from the following description of one embodiment which is given by way of explanation without any limitation being implied, reference being made to the accompanying drawings, in which:

FIG. 2 shows examples of wall-generating lines for obtaining sinusoidal modulation of the magnetic field on the axis of the device.

Figure 1:
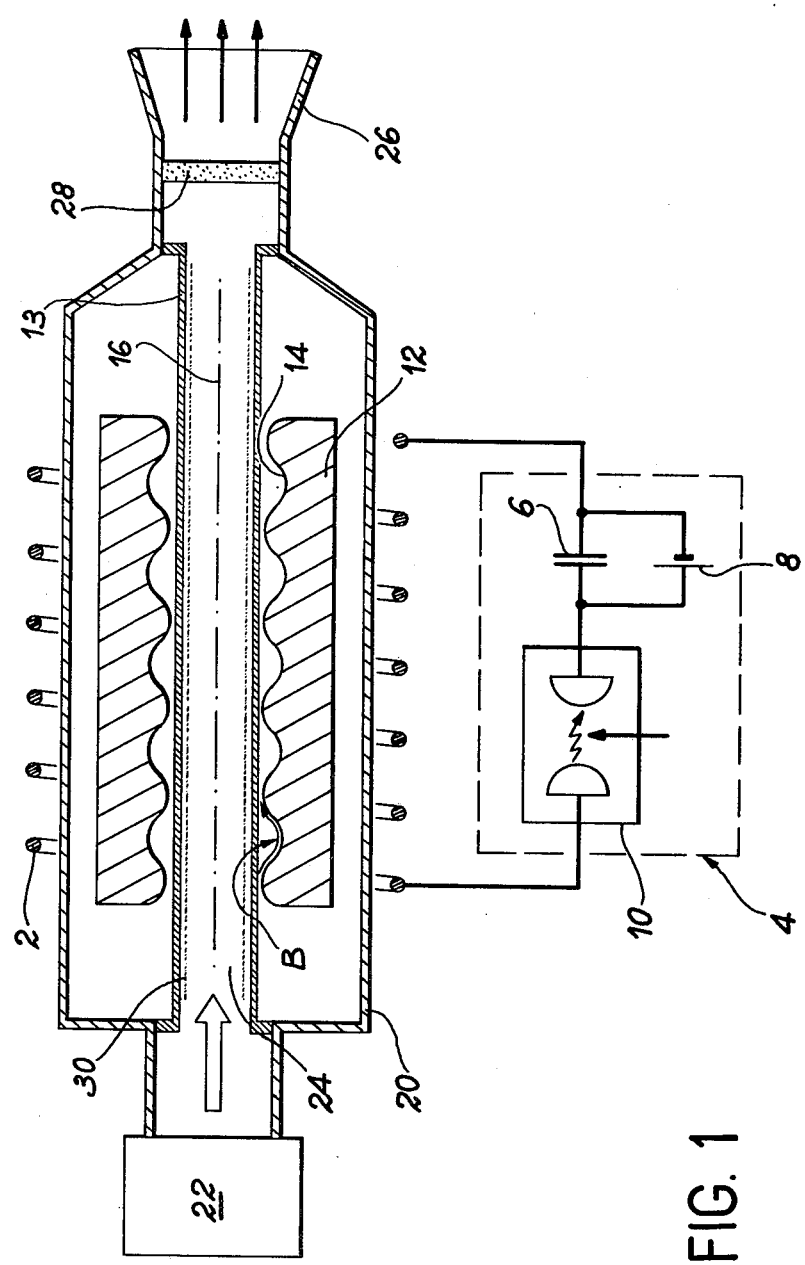
FIG. 1 is a diagrammatic sectional view of a free-electron laser according to the invention.

The device shown in FIG. 1 comprises a conductive winding 2 (which may be a superconducting winding) connected to current pulse supply means 4, said means being essentially constituted by a capacitor 6 charged by a voltage source 8 and by a spark-gap 10. The device which is illustrated further comprises a split metallic tube 12 placed inside the winding and in a coaxial arrangement, the inner wall 14 of said tube being undulated periodically along the axis. The material constituting the tube 12 has good electrical conductivity (copper, for example) and has a skin thickness which is considerably smaller than the tube thickness at the angular frequency $2\pi/T$ corresponding to the reciprocal of the time-duration T of the current pulses. In consequence and as explained earlier, the magnetic induction B cannot penetrate deeply into the mass of the conductor and follows the inner wall 14 of the tube. Since the flux is conservative, this results in periodic modulation of the magnetic induction within the tube 12.

The free-electron laser according to the invention further comprises a vacuum enclosure 20 and means for injecting a beam 24 of relativistic electrons into the tube 12. Said beam produces a synchrotron radiation which is amplified as it passes through the tube and emerges through a guide 26 which is closed by a vacuum-tight transparent window 28.

The beam 24 can be either a full beam injected along the axis 16 of the apparatus or a hollow cylindrical beam 30 having an axis 16.

As mentioned earlier, it can be ensured if necessary that the internal dimensions of the tube 12 are such that this latter behaves as a waveguide for the generated and amplified electromagnetic wave. The periodic nature of the inner wall 14 makes this guide comparable to a delay line in which the electromagnetic wave travels at a phase velocity which is lower than the velocity of propagation in free space, which can prove useful in certain types of interaction.

If necessary, the laser according to the invention can comprise within the interior of the first tube 12 a second metallic tube 13 having a thickness of low value in comparison with the skin thickness at the frequency $2\pi/T$ but of high value compared with the skin thickness at the frequency of amplified radiation.

By way of explanation, the material employed for the fabrication of the tube 12 can be copper. In the case of this material and at a frequency of 1 kHz corresponding to a period T of 1 ms, the skin thickness is of the order of 1 mm and the smallest thickness of the tube 12 is of the order of 1 cm.

In regard to the tube 13, this latter can be of stainless steel and have a thickness in the vicinity of 0.2 mm. In the case of this material, the skin thickness is at the frequency corresponding to T=1 ms of the order of 7 mm and at the frequency corresponding to a millimeter wave (E.H.F. wave) of the order of 0.4 μm.

The shape to be given to the wall 14 depends on the variations in magnetic induction which it is desired to obtain within the interaction space. For example, it is possible to construct a wall 14 such that the magnetic induction varies in a purely sinusoidal manner along the axis 16. In this case the induction along the axis can be written in polar coordinates r and z:

$$B(O,z) = B_0 + B_j \cos kz$$

where
$B_0$ is the mean value of the field,
$B_1$ is the modulation amplitude,
k is the number of waves of the pump wave.

The solution of the Maxwell equations within the internal space of the tube makes it possible to calculate at any coordinate point r and z both the radial component $B_r$ and the axial component $B_z$. These components are given by the following equations:

$$B_r(r,z) = B_1 I_1(\pi r/L) \sin (\pi z/L)$$

$$B_z(r,z) = B_0 + B_1 I_0(\pi r/L) \cos (\pi z/L)$$

where $I_0$ and $I_1$ are the Bessel functions of the first kind and L is the pitch of the wall of the flux concentrator. It is possible to deduce therefrom the shape of the internal surface of the tube which is determined by the differential equation of the first order as follows:

$$dz/dr = B_z(r,z)/B_r(r,z)$$

This equation can be solved numerically without difficulty. There are then obtained the generating curves of the cylinder which are shown in FIG. 2. In this figure, the parameter a/λ is plotted as ordinates and the parameter Z/λ is plotted as abscissae in which a is the minimum radius of the structure, λ is the length of periodicity and Z is the distance along the axis. These curves are obtained in respect of $\Delta B_z/B_z = 5\%$ on the axis.

This calculation shows that the useful diameter of the tube 12 is of the same order as the length of periodicity of the magnetic field to be produced and that said diameter decreases when the modulation ratio increases. The device according to the invention is therefore chiefly useful when this length is of the order of one millimeter or more.

It is naturally possible to choose variations in induction other than sinusoidal variations along the axis and to deduce by means of the same calculation the shape to be given to the inner wall of the tube.

It is even possible to start from initial conditions which are not established on the axis of the device but along a particular surface such as a cylinder, for example, on which the electrons are injected.

It is readily apparent that, in the example hereinabove described, the tube 12 is of revolution only by way of illustration and that it can have different shapes such as a parallelepipedal shape, for example. In this case, a certain number of tube walls could be flat. If so required, some walls could have different periodicities.

It may prove particularly advantageous to produce a periodic and rotating transverse magnetic field as represented on the axis by:

$$B_r^0 = B_0 I_1'(r/c) \sin (\theta - z/c)$$

$$B_\theta^0 = B_0 (I_1(r/c)/r/c \cos (\theta - z/c)$$

$$B_z^0 = -B_0 I_1(r/c) \cos (\theta - z/c)$$

where $B_0$ characterizes the amplitude of the transverse field, c characterizes the dimension of the tube 12 whilst r, θ, z are the usual cylindrical coordinates and $I_1$ and $I_1'$ are Bessel functions.

This field is employed, for example, in the theoretical model of a collective-effect free-electron laser studied by Pierre Drossart in a degree thesis submitted to Paris-VI University on Nov. 15, 1978 on completion of third-stage studies on Gas and Plasma Physics.

By means of the device according to the invention, the field aforesaid can very readily be produced with an internal shape of the tube 12 which resembles an interanl screw-thread having a pitch corresponding to the length of periodicity.

We claim:

1. A free-electron laser comprising an electrically conductive winding, said winding having an axis, a current-pulse supply connected to said winding, said supply delivering current pulses having a duration, said duration defining a reciprocal duration, said winding so supplied by said current pulses constituting a pumping means, a split metallic tube placed inside said winding, said tube having a thickness and having an axis in coincidence with said axis of said winding, said tube having an inner wall, said wall being undulated periodically along the axis of the tube, said tube being formed of a conducting material having a skin-thickness at a frequency equal to said reciprocal duration of said current pulses, said skin-thickness being smaller than said thickness of the tube, a vacuum enclosure for sustaining a vacuum inside said tube, an electron source for injecting a beam of relativistic electrons into said tube in a direction parallel to the axis of said tube, said beam of electrons producing an electromagnetic radiation having a frequency and propagating in a direction parallel to the axis of the tube, said beam of electrons acting as an amplifying medium for said radiation, a vacuum-tight transparent window attached to the vacuum enclosure on the axis of said tube, said radiation emerging from said enclosure through said window and constituting the radiation delivered by said laser.

2. A free-electron laser according to claim 1, further comprising a second metallic tube placed inside said split metallic tube, said second metallic tube having a thickness and having a first skin-thickness at a frequency corresponding to said reciprocal duration of the current pulses, said thickness being smaller than said first skin-thickness.

3. A free-electron laser according to claim 2, wherein the second tube has a second skin-thickness at a frequency equal to said frequency of the electromagnetic radiation, said thickness of the second tube being greater than said second skin-thickness.

4. A free-electron laser according to claim 1, wherein said split metallic tube constitutes a waveguide for said radiation.

5. A free-electron laser according to claim 1, wherein said split metallic tube is of revolution symmetry about its axis.

* * * * *